(12) United States Patent
Abe et al.

(10) Patent No.: US 11,687,849 B2
(45) Date of Patent: Jun. 27, 2023

(54) INFORMATION PROCESSING APPARATUS, INFORMATION PROCESSING METHOD, AND PROGRAM

(71) Applicant: NEC Corporation, Tokyo (JP)

(72) Inventors: Katsumi Abe, Tokyo (JP); Yoshihisa Manzen, Tokyo (JP); Yutaka Kawasaki, Tokyo (JP); Tadashi Okano, Tokyo (JP); Tomoki Yamabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 132 days.

(21) Appl. No.: 17/205,696

(22) Filed: Mar. 18, 2021

(65) Prior Publication Data
US 2021/0304111 A1 Sep. 30, 2021

(30) Foreign Application Priority Data
Mar. 27, 2020 (JP) ................. 2020-058425

(51) Int. Cl.
*G06Q 10/00* (2023.01)
*G06Q 10/0631* (2023.01)
*G10L 17/00* (2013.01)
*G06V 40/20* (2022.01)
*G06V 40/16* (2022.01)

(52) U.S. Cl.
CPC ... *G06Q 10/063112* (2013.01); *G06V 40/174* (2022.01); *G06V 40/20* (2022.01); *G10L 17/00* (2013.01)

(58) Field of Classification Search
None
See application file for complete search history.

(56) References Cited

U.S. PATENT DOCUMENTS

| 2009/0254404 A1* | 10/2009 | Eggenberger | G06Q 10/06 705/7.14 |
| 2014/0081654 A1* | 3/2014 | Bechtel | G16H 40/63 705/2 |
| 2014/0108041 A1* | 4/2014 | Bechtel | G16H 50/50 705/2 |
| 2015/0057635 A1* | 2/2015 | Bechtel | A61B 5/7275 604/151 |

(Continued)

FOREIGN PATENT DOCUMENTS

| JP | 2009-123148 A | 6/2009 |
| JP | 6531323 B1 | 6/2019 |

OTHER PUBLICATIONS

Cohen, Iris, Work content influences on cognitive task load, emotional state and performance during a simulated 520-days' Mars mission, Nov. 12, 2015, ScienceDirect—Elsevier,https://www.sciencedirect.com/science/article/pii/S0747563215301904, p. 1-11. (Year: 2015).*

*Primary Examiner* — Joseph M Waesco
(74) *Attorney, Agent, or Firm* — Sughrue Mion, PLLC

(57) ABSTRACT

An information processing apparatus includes an acquisition unit that acquires work information associated with a content of work and a point in time at which the work was performed, and emotion information that records an emotion of a person who performed the work for each point in time, and a generation unit that generates aptitude information indicating an aptitude for the work for each person by associating the work information and the emotion information using a point in time.

12 Claims, 16 Drawing Sheets

(56) References Cited

U.S. PATENT DOCUMENTS

| | | | |
|---|---|---|---|
| 2016/0030834 A1* | 2/2016 | Brown | G06Q 30/0631 |
| | | | 463/36 |
| 2017/0103360 A1* | 4/2017 | Ristock | H04L 67/52 |
| 2018/0104409 A1* | 4/2018 | Bechtel | G08B 21/0492 |
| 2019/0026681 A1* | 1/2019 | Polli | G06Q 10/06398 |
| 2019/0318291 A1* | 10/2019 | Diriye | G06Q 10/063112 |
| 2020/0046277 A1* | 2/2020 | Dolsma | G09B 5/10 |
| 2020/0210961 A1* | 7/2020 | Rosental | G06Q 10/0836 |
| 2021/0187386 A1* | 6/2021 | Cozad | G06Q 30/0201 |
| 2021/0233031 A1* | 7/2021 | Preuss | A61B 5/167 |
| 2021/0279668 A1* | 9/2021 | Mikhajlov | G06F 21/32 |
| 2022/0150401 A1* | 5/2022 | Tadano | H04N 5/23222 |

* cited by examiner

FIG. 4A

110 WORK INFORMATION

| USER ID | 10013 (TARO YAMADA) | |
|---|---|---|
| WORK ID | START TIME | FINISH TIME |
| A001 (WORK A) | 2020/03/10 09:05 | 2020/03/10 12:00 |
| B003 (WORK B) | 2020/03/10 13:00 | 2020/03/10 17:15 |
| ⋮ | ⋮ | ⋮ |

FIG. 4B

120 EMOTION INFORMATION

| USER ID | 10013 (TARO YAMADA) | |
|---|---|---|
| POINT IN TIME | COMFORT/ DISCOMFORT | AWAKENING DEGREE |
| 2020/03/10 9:00 | 0.8 | 0.9 |
| 2020/03/10 9:10 | 0.8 | 0.9 |
| ⋮ | ⋮ | ⋮ |

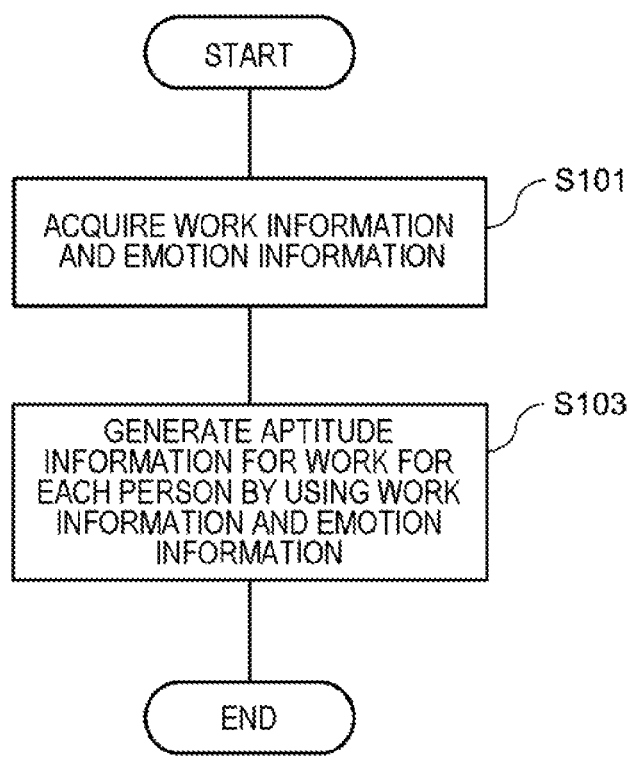

FIG. 8

| USER ID | 10013 (TARO YAMADA) | | |
|---|---|---|---|
| POINT IN TIME | COMFORT/ DISCOMFORT | AWAKENING DEGREE | REGION |
| 2020/03/10 9:00 | 0.8 | 0.9 | A |
| 2020/03/10 9:10 | 0.8 | 0.9 | A |
| ⋮ | ⋮ | ⋮ | ⋮ |

120 EMOTION INFORMATION
130 APTITUDE INFORMATION

FIG. 10

| USER ID | 10013 (TARO YAMADA) | | | | |
|---|---|---|---|---|---|
| VITAL INFORMATION | PULSE RATE (bpm) | NUMBER OF STEPS (STEPS/ 10 MINUTES) | SKIN TEMPERATURE (°C) | ... | |
| 2020/03/10 9:00 | 98 | 120 | 36.5 | ... | |
| 2020/03/10 9:10 | 60 | 0 | 36.4 | ... | |
| ⋮ | ⋮ | ⋮ | ⋮ | ⋮ | |

140 VITAL INFORMATION

FIG. 14

160 WORKER CANDIDATE LIST

| A001 | WORK A |
|---|---|
| ID | NAME |
| 10013 | TARO YAMADA |
| 10156 | HANAKO SUZUKI |
| ⋮ | ⋮ |

FIG. 16

170 ATTRIBUTE INFORMATION

| | |
|---|---|
| USER ID | 10013 |
| NAME | TARO YAMADA |
| DEPARTMENT | FIRST SALES DEVISION |
| GENDER | MALE |
| AGE | 35 |
| LENGTH OF SERVICE | 13 YEARS |
| ⋮ | ⋮ |

INFORMATION PROCESSING APPARATUS, INFORMATION PROCESSING METHOD, AND PROGRAM

This application is based on Japanese patent application No. 2020-058425, the content of which is incorporated hereinto by reference.

BACKGROUND

Technical Field

The present invention relates to an information processing apparatus, an information processing method, and a program.

Related Art

Japanese Patent Application Publication No. 2009-123148 discloses a method of allocating work of a person in charge on the basis of an emotional state of a person in a case where the work is divided among a plurality of persons. In this method, when a processing request is made, a state of a request destination is inferred on the basis of emotion information of a user who is the request destination and a change history of the emotion information. The emotion information is inferred on the basis of voices collected from a microphone and an action analyzed from images captured by a camera. A timing for the request is also taken into consideration by combining a request timing history of the request destination user hitherto.

Japanese Patent No. 6531323 discloses a method of determining a business negotiation person who conducts business negotiations with each business negotiation partner from among a plurality of business negotiation persons, and a business negotiation strategy for the business negotiation partner, on the basis of information regarding the business negotiation partner. The information regarding the business negotiation partner and the policy of the business negotiation are input to a learned model for determining a person in charge, and an output value from the learned model for determining a person in charge is acquired. The output value indicates the degree of appropriateness for a business negotiation partner, and a person in charge with the maximum output value is determined as a business negotiation person.

SUMMARY

In general, weak work varies from person to person. In order to improve work efficiency, it is preferable not to assign work to a person who is not good at the work. In order to do this, it is necessary to manage weak work for each person.

The present invention has been made in view of the above circumstances, and an object of the present invention is to manage weak work for each person.

In each aspect of the present invention, the following configuration is employed to solve the above-described problem.

In one embodiment, there is provided an information processing apparatus.

The information processing apparatus according to one embodiment includes an acquisition unit that acquires work information that distinguishes contents of work, and emotion information of a person who performed the work; and a generation unit that generates aptitude information indicating an aptitude degree for the work for each person in association with the work information and the emotion information.

In another embodiment, there is provided an information processing method for an information processing apparatus, executed by at least one computer.

The information processing method according to another embodiment executed by an information processing apparatus includes acquiring work information that distinguishes contents of work, and emotion information of a person who performed the work; and generating aptitude information indicating an aptitude degree for the work for each person in association with the work information and the emotion information.

Note that other aspects of the present invention may relate to a program causing at least one computer to execute the method of the another embodiment mentioned above, and may relate to a computer readable storage medium storing the program. The storage medium includes a non-transitory medium.

The computer program includes computer program codes causing a computer to execute the information processing method on the information processing apparatus when the program is executed by the computer.

Note that any combination of the above-described constituent elements, and expressional conversion of the present invention among a method, an apparatus, a system, a storage medium, a computer program, and the like is also effective as an aspect of the present invention.

Various constituent elements of the present invention are not necessarily required to be individually independent elements. For example, a plurality of constituent elements may be configured as a single member, a single constituent element may be configured with a plurality of members, any constituent element may be a part of another constituent element, and a part of any constituent element may overlap a part of another constituent element.

A plurality of procedures are sequentially described in the method and the computer program according to the present invention, but the order of description does not limit an order of executing the plurality of procedures. Thus, in a case where the method and the computer program of the present invention are executed, the order of the plurality of procedures may be changed within the scope without contradiction to contents thereof.

The plurality of procedures of the method and the computer program of the present invention are not limited to being respectively executed at different timings. Thus, any procedure may occur during execution of another procedure, and an execution timing of any procedure may partially or entirely overlap an execution timing of another procedure.

According to the respective aspects, it is possible to provide a technique for managing work that is not good for each person.

BRIEF DESCRIPTION OF THE DRAWINGS

The above and other objects, advantages and features of the present invention will be more apparent from the following description of certain preferred embodiments taken in conjunction with the accompanying drawings, in which:

FIGS. 4A and 4B are diagrams illustrating examples of data structures of work information and emotion information.

FIG. 6 is a flowchart illustrating an example of an operation of the information processing apparatus of the present example embodiment.

FIG. 8 illustrates an example of aptitude information generated from emotion information.

FIG. 10 is a diagram illustrating an example of a data structure of vital information.

FIG. 14 is a diagram illustrating an example of a worker candidate list.

FIG. 16 is a diagram illustrating an example of a data structure of attribute information.

DETAILED DESCRIPTION

Figure 1:
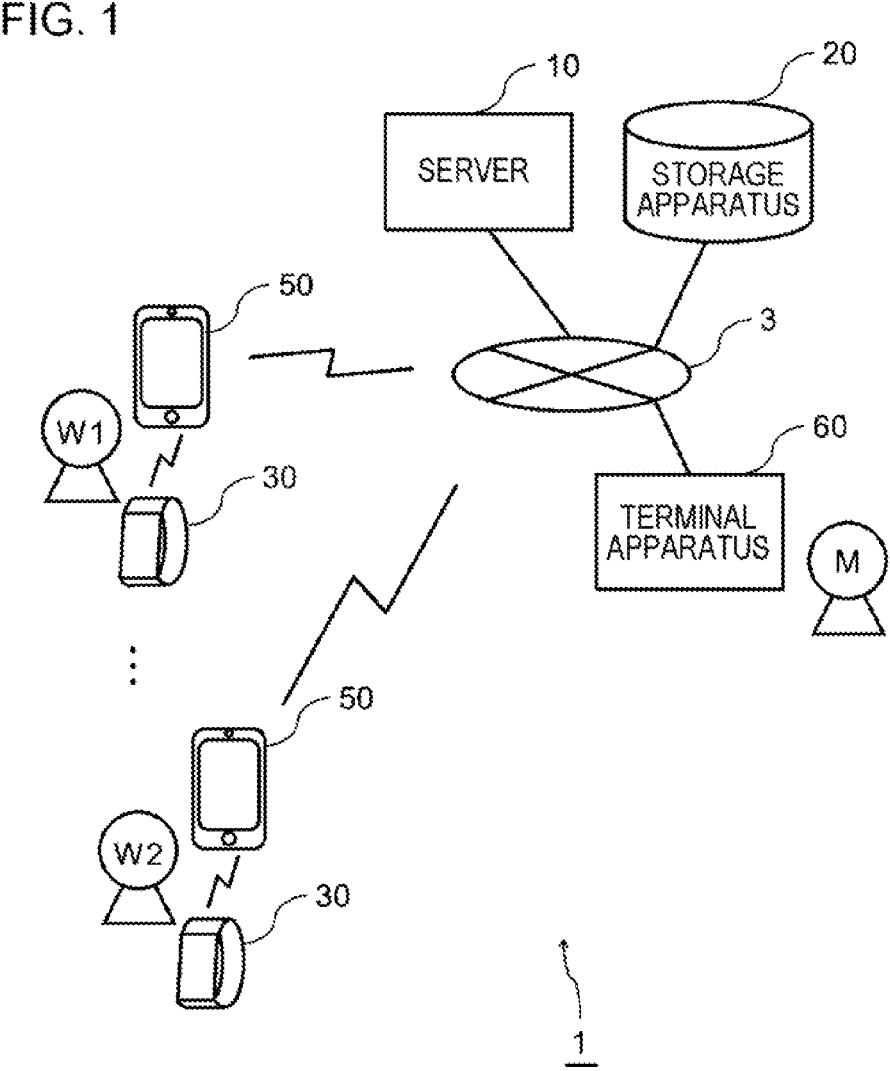
FIG. 1 is a conceptual diagram illustrating a configuration of an information processing system according to an example embodiment of the present invention.

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Hereinafter, example embodiments of the present invention will be described with reference to the drawings. Note that the same constituent element is given the same reference numeral throughout all the drawings, and description thereof will not be repeated as appropriate. In each drawing, a configuration of a unit having no relation to the essence of the present invention is omitted and is not illustrated.

In the example embodiments, the "acquisition" includes at least one of a host apparatus fetching (active acquisition) data or information stored in another apparatus or a storage medium and the host apparatus receiving (passive acquisition) data or information which is output from another apparatus. As an example of the active acquisition, there are a case where a host apparatus sends a request or an inquiry to another apparatus, and receives a response thereto, and a case where the host apparatus accesses another apparatus or a storage medium, and reads data or information. As an example of the passive acquisition, there is a case where a host apparatus receives delivered information (alternatively, transmitted information or information sent through push notification). The "acquisition" may include selectively acquiring data or information from received data or information, or selectively receiving delivered data or information.

First Example Embodiment

<System Overview>

FIG. 1 is a diagram illustrating a configuration example of an information processing system 1 according to an example embodiment of the present invention. The information processing system 1 includes a server 10, a wearable terminal 30, a mobile terminal 50, and a terminal apparatus 60. The information processing system 1 includes a storage apparatus 20.

The server 10 is a computer 1000 that implements an information processing apparatus 100 described later. The server 10 may be a virtual server. The respective apparatuses are connected to each other through a communication network 3.

The storage apparatus 20 stores and accumulates various pieces of information (for example, work information 110, emotion information 120, and aptitude information 130 which will be described later) used by the server 10. The storage apparatus 20 may be provided inside or outside the server 10. That is, the storage apparatus 20 may be hardware integrated with the server 10 or may be hardware separate from the server 10.

The wearable terminal 30 is worn by workers W1 and W2 (hereinafter, referred to as a worker W in a case where the works are not required to be particularly differentiated from each other), and collects vital information of the worker W in real time. Details of the vital information will be described later. In the example embodiment, the wearable terminal 30 has a structure attached to the wrist of the worker W, but is not limited thereto. For example, the wearable terminal 30 may be of the eyeglasses type, the ear canal type, or the type of being mounted on other parts of the body such as the head, the torso (including the clothing type), legs, arms, and neck and, the type of being attached to the surface of the skin, and a plurality of types of wearable terminals 30 may be combined with each other.

The mobile terminal 50 is carried by the worker W, receives vital information from the wearable terminal 30, and further transfers the received vital information to the server 10. The mobile terminal 50 is, for example, a smartphone, a tablet terminal, or a personal computer. The terminal apparatus 60 is operated by a manager M and displays various pieces of information generated by the server 10.

The transmission of the vital information from the wearable terminal 30 to the mobile terminal 50, or the transmission (upload) of the vital information from the mobile terminal 50 to the server 10 may be automatically performed at predetermined intervals, or at a predetermined time (for example, at the time of going to work, at the start of work, after the work is completed, at the time of leaving work, or the like) or at any timing.

Hardware Configuration Example

Figure 2:
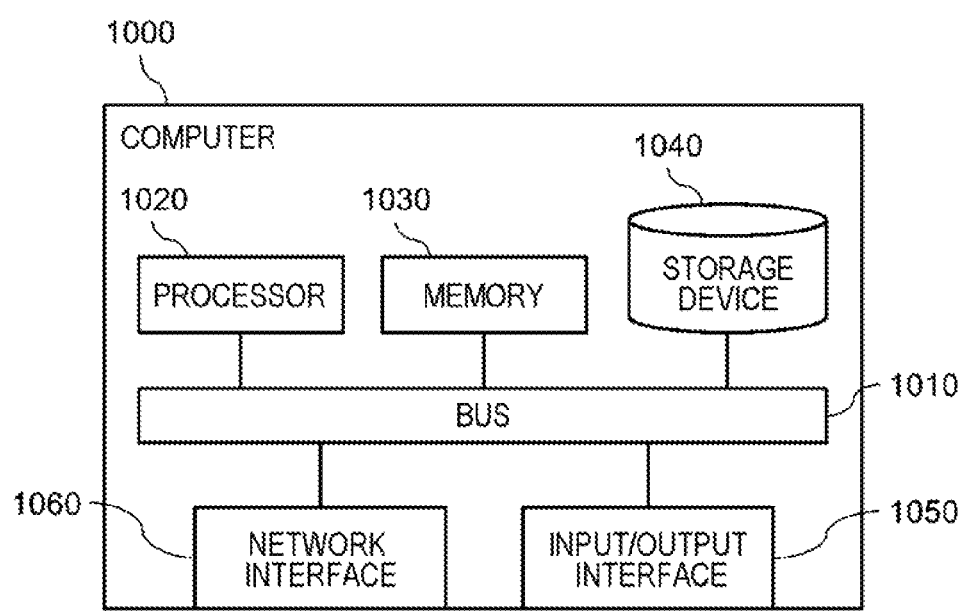
FIG. 2 is a block diagram exemplifying a hardware configuration of a computer that implements an information processing apparatus described later.

FIG. 2 is a block diagram exemplifying a hardware configuration of the computer 1000 that implements the information processing apparatus 100 (the server 10 in FIG. 1) described later. The wearable terminal 30, the mobile terminal 50, and the terminal apparatus 60 in FIG. 1 are also implemented by the computer 1000.

The computer 1000 has a bus 1010, a processor 1020, a memory 1030, a storage device 1040, an input/output interface 1050, and a network interface 1060.

The bus 1010 is a data transmission path through which the processor 1020, the memory 1030, the storage device 1040, the input/output interface 1050, and the network interface 1060 transmit and receive data to and from each other. However, a method of connecting the processor 1020 and the like to each other is not limited to bus connection.

The processor 1020 is a processor implemented by a central processing unit (CPU), a graphics processing unit (GPU), or the like.

The memory 1030 is a main storage device implemented by a random access memory (RAM) or the like.

The storage device 1040 is an auxiliary storage device implemented by a hard disk drive (HDD), a solid state drive (SSD), a memory card, a read only memory (ROM), or the like. The storage device 1040 stores a program module that realizes each function (for example, an acquisition unit 102, a generation unit 104, a data analysis processing unit 106, and an output unit 108 which will be described later) of the information processing apparatus 100. The processor 1020 reads each of these program modules into the memory 1030 and executes the program modules, and thus each function corresponding to the program module is realized. The storage device 1040 may also store each piece of data of the storage apparatus 20.

The program module may be recorded on a storage medium. The storage medium for recording the program module may include a medium that can be used by the non-transitory tangible computer 1000, and program codes that can be read by the computer 1000 (processor 1020) may be embedded in the medium.

The input/output interface 1050 is an interface connecting the computer 1000 and various input/output devices to each other. The input/output interface 1050 also functions as a communication interface performing short-range wireless communication such as Bluetooth (registered trademark).

The network interface 1060 is an interface connecting the computer 1000 to a communication network. The communication network is, for example, a local area network (LAN) or a wide area network (WAN). A method of connecting the network interface 1060 to the communication network may be wireless connection or wired connection.

Then, the computer 1000 is connected to necessary devices (for example, the server 10 and the mobile terminal 50, the mobile terminal 50 and the wearable terminal 30, the server 10 and the terminal apparatus 60, or a display, an operation key, a keyboard, a mouse, a speaker, a microphone, or a printer (not illustrated)) through the input/output interface 1050 or the network interface 1060.

The information processing apparatus 100 is implemented by installing an application program for implementing the information processing apparatus 100 in the computer 1000 and starting the application program.

Functional Configuration Example

Figure 3:
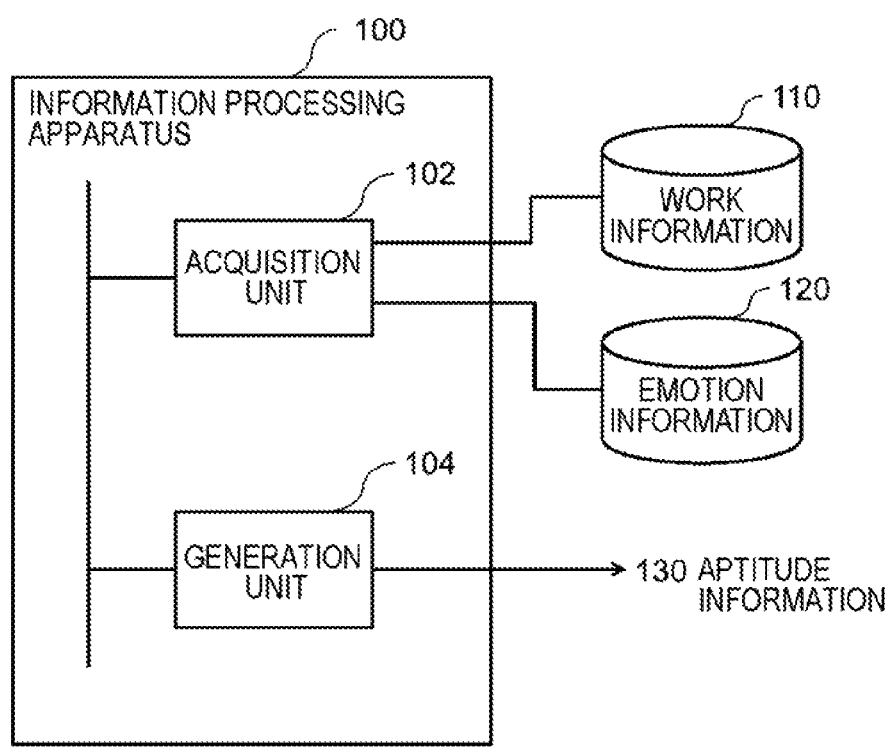
FIG. 3 is a functional block diagram illustrating a logical configuration of the information processing apparatus according to the example embodiment of the present invention.

FIG. 3 is a functional block diagram illustrating a logical configuration of the information processing apparatus 100 according to the example embodiment of the present invention. The information processing apparatus 100 includes an acquisition unit 102 and a generation unit 104.

The acquisition unit 102 acquires the work information 110 in which a content of work and a point in time at which the work was performed are associated with each other, and the emotion information 120 in which an emotion of a person who performed the work for each point in time is recorded.

The generation unit 104 generates the aptitude information 130 indicating the aptitude degree for work for each person by associating the work information 110 and the emotion information 120 using a point in time.

The work information 110 and the emotion information 120 are stored in the storage apparatus 20. FIG. 4A is a diagram illustrating an example of a data structure of the work information 110. FIG. 4B is a diagram illustrating an example of a data structure of the emotion information 120.

Identification information (work ID) indicating a work content, a start time of the work, and a finish time of the work are stored in association with one other, as the work information 110, for each user. It is assumed that detailed information of the work content corresponding to the work ID is separately stored in the storage apparatus 20 as work content information. In this example, the start time and the finish time are recorded in association with each piece of work. In another example, work performed for each point in time, each time, each time slot, each period, or the like may be stored in association with each other. The work content information may further include information regarding classification of in-company/out-company work, the number of persons of a team performing the work, and a position of a worker (for example, a team leader). The work content information may also include customer information (for example, importance or a client), information indicating a scale of business to which the work is related (for example, an order amount), the delivery date (short delivery date), and special work (high-place work, hazardous material handling work, work in a controlled area, or the like). The work content information may include environmental information such as a temperature, humidity, atmospheric pressure, an ultraviolet ray amount, illuminance, and environmental sound of a work place, and information such as a location or an area.

Identification information (user ID) is assigned to each worker W. For each user, information such as a name and department may be stored in the storage apparatus 20 as user information (not illustrated). The worker W may be able to acquire a user account in advance and register user information. The worker W may be able to log in and view various pieces of information regarding the worker W by using the user account. An application for using the service of the information processing system 1 may be installed in the mobile terminal 50 of the worker W and the worker W may log in, or the worker W may access a website specified by a predetermined Uniform Resource Locator (URL) by using a browser and log in.

The emotion information 120 stores information indicating an emotional state for each point in time in association with each user. As an example, the emotion information 120 uses states of comfort and discomfort of the worker W as a first index. The generation unit 104 generates the aptitude information 130 by using coordinates with the first index (states of comfort and discomfort) as a first axis.

The emotion information 120 further uses a awakening degree of the worker W for each point in time as a second index. The generation unit 104 generates the aptitude information 130 by using coordinates with the first index (states of comfort and discomfort) as the first axis and the second index (awakening degree) as a second axis.

In the example illustrated in FIG. 4B, the emotion information 120 is stored every 10 minutes, but the present embodiment is not limited thereto. A time interval for storing the emotion information 120 may be every minute, every hour, or every predetermined period. The information every 10 minutes may be an average value or a median value for the 10 minutes. The maximum value, the minimum value, a standard deviation, the skewness, the kurtosis, and the like may be included.

Figure 5A:
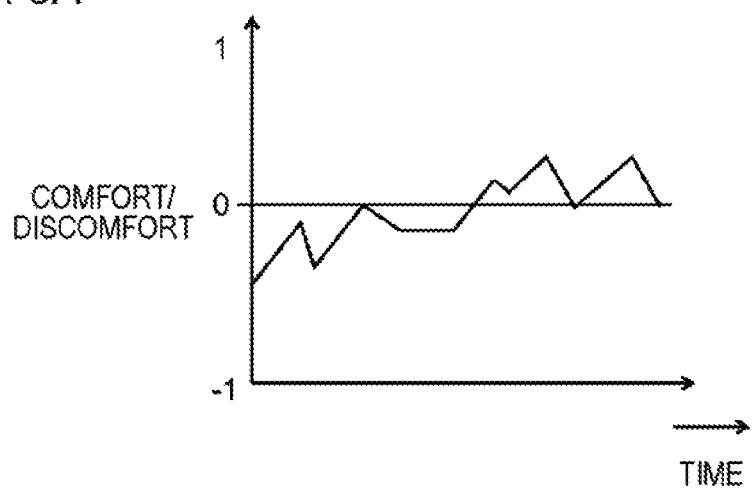
FIGS. 5A and 5B are diagrams illustrating a temporal change of an emotional state of a worker.
Figure 5B:
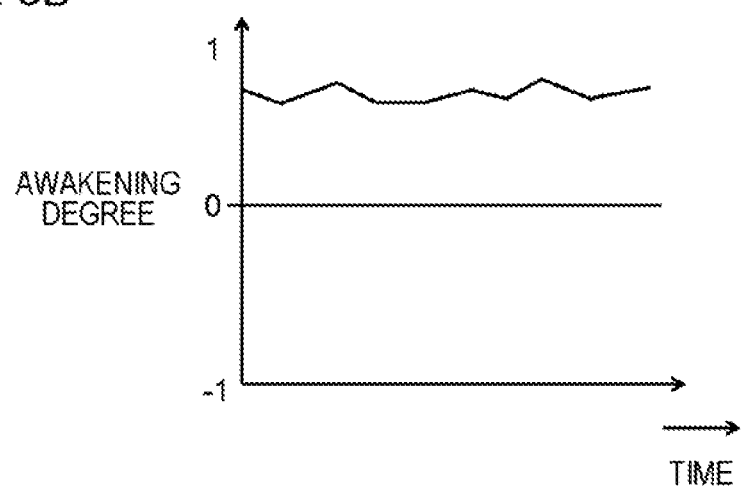

FIG. 5A is a diagram illustrating temporal changes of the states of comfort and discomfort of the worker W. Indexes of comfort and discomfort are 0 for a standard state, −1 for the most discomfortable state, and 1 for the most comfortable state. FIG. 5B is a diagram illustrating a temporal change of the awakening degree of the worker W. The awakening degree is 0 for a standard state, −1 for the sleepiest state, and 1 for the most awakening state.

A method of generating the work information 110 and the emotion information 120 will be described in a second example embodiment described later.

The graphs in FIGS. 5A and 5B may be displayed on a screen of the terminal apparatus 60 or the mobile terminal 50 of the worker W.

Operation Example

FIG. 6 is a flowchart illustrating an operation example of the information processing apparatus 100 of the present example embodiment.

First, the acquisition unit 102 acquires the work information 110 and the emotion information 120 (step S101).

The generation unit 104 associates the work information 110 and the emotion information 120 using the time, and generates the aptitude information 130 indicating the aptitude degree for work for each person (step S103). The generated aptitude information 130 may be stored in the storage apparatus 20 in association with the aptitude degree for the work for each person.

Figure 7A:
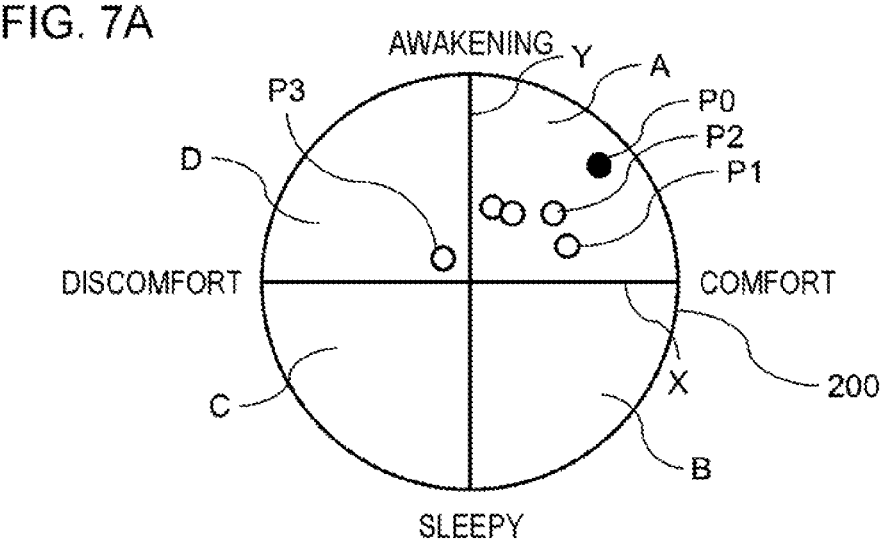
FIGS. 7A and 7B are diagrams illustrating an example of a display screen of a graph in which a ratio of aptitude information and an emotional state is visualized and schematically represented.

The generation unit 104 generates the aptitude information 130 by using the coordinates with the states of comfort and discomfort of the worker W, which are the first index of the emotion information 120, as the first axis (X), and the awakening degree of the worker W, which is the second index of the emotion information 120, as the second axis (Y). FIG. 7A is a diagram illustrating an example of a graph 200 in which the aptitude information 130 generated by the generation unit 104 is visualized and schematically represented. The graph 200 may be displayed on the screen of, for example, the terminal apparatus 60 or the mobile terminal 50 of the worker W.

The aptitude information 130 of the worker W at a point of current time is indicated by a black circle P0. Other white circles P1, P2, and the like indicate the aptitude information 130 of the worker W at respective points in time (for example, 10 minutes ago and 20 minutes ago) that goes back to the past from the current time. In the example in the figure, the aptitude information 130 from the current time up to 50 minutes ago is illustrated. The aptitude information 130 (P0) at the current time indicates positive values for both the first axis and the second axis. The aptitude information 130 (P3) 30 minutes ago indicates a negative value for the first axis and a positive value for the second axis.

In this figure, the aptitude information 130 for a past predetermined period is illustrated in the graph 200 with the current time as a reference. However, the aptitude information 130 for the past predetermined period may be displayed by specifying a point in time and using the specified point in time as a reference.

The graph 200 in FIG. 7A has four regions A, B, C, and D separated by the X-axis and the Y-axis. Each region visualizes and schematically indicates the aptitude information 130 for work performed by the worker at that time.

The region A indicates a state in which both of the comfort and discomfort and the awakening degree have values of 0 to 1. The worker W in the state of this region A is actively working in a state of being moderately tense, for example, and shows a state of having a sense of satisfaction or happiness. In other words, for example, the region A indicates that the work being performed at that time is suitable for the worker W and the worker W is good at the work.

The region B indicates a state in which the comfort and discomfort has values of 0 to 1 and the awakening degree has values of 0 to −1. The worker W in the state of this region B shows, for example, a state of being working or resting with a calm and relaxed feeling. In other words, the region B indicates, for example, that the work being performed at that time is easy for the worker W.

The region C indicates a state in which both of the comfort and discomfort and the awakening degree have values of 0 to −1. The worker W in the state of this region C shows, for example, that the worker W is in a depressed mood due to a decrease in work efficiency in a tired state. In other words, the region C indicates, for example, that the work being performed at that time is difficult and unsuitable for the worker W, and the worker W is not good at the work.

The region D indicates a state in which the comfort and discomfort has values of 0 to −1, and the awakening degree has values of 0 to 1. The worker W in the state of this region D shows, for example, that the worker W is working in a tense state and shows a state of being stressed, frustrated, excited, or angry. In other words, the region D indicates, for example, that the work being performed at that time is not suitable for the worker W or is incompatible with the worker W.

Figure 7B:
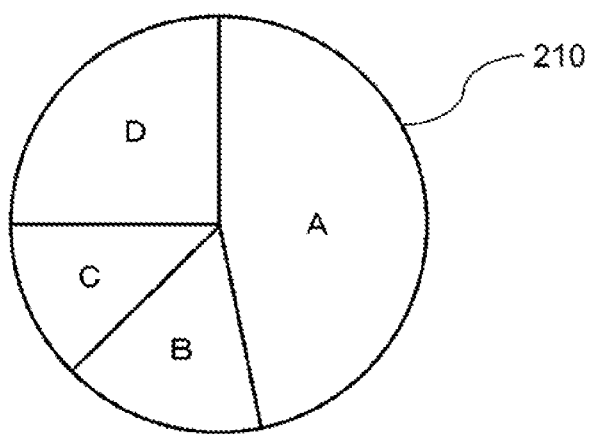

FIG. 7B is a diagram illustrating an example of a screen displaying a ratio of the states A to D of the aptitude information 130 of the worker W for a predetermined period in a pie chart 210. The pie chart 210 may be displayed on the screen of, for example, the terminal apparatus 60 or the mobile terminal 50 of the worker W. The pie chart 210 may indicate a state of the worker W for each piece of work during a predetermined period. In a case where the pie charts 210 indicating states of a plurality of pieces of work are displayed side by side, the pieces of aptitude information 130 for respective pieces of work of the worker W can be compared with each other, and work that the worker W is good at or work that the worker W is not good at can be identified.

FIG. 8 illustrates an example of the aptitude information 130 generated from the emotion information 120 in the generation unit 104. In this example, the aptitude information 130 indicates a region plotted when the emotion information 120 is plotted on the graph 200.

The aptitude information 130 indicates the aptitude degree for each piece of work of the worker W. The generation unit 104 computes the aptitude degree by using distributions of the emotion information 120 plotted at the coordinates shown in the graph 200 described above, the frequency of satisfying any condition at a predetermined time interval, and the like. The generation unit 104 computes the aptitude degree at a predetermined time interval. The predetermined time interval is at least one of any time interval (for example, 1 minute or 5 minutes), each business hour, and for each working time of each piece of work within the business hour. The generation unit 104 may further use a difference of the emotion information 120 between a certain point in time and a point in time before the certain point in time to compute the aptitude degree. The generation unit 104 may further use a difference between an average value of the past emotion information 120 of the worker and a value at the current time to compute the aptitude degree. Any conditions or time intervals used to compute the aptitude degree may be common to all workers W, specialized conditions for each individual, or a combination of common conditions and specialized conditions.

Any conditions are, for example, an amount of change in a coordinate distribution, a direction of change (a direction of movement on coordinates), a rate of change, and a difference from an average value of the entire target time at predetermined time intervals.

The aptitude information 130 may indicate the degree of aptitude with an index such as 0 to 100%. For example, a smaller value may indicate a lower aptitude, and a greater value may indicate a higher aptitude. The aptitude information 130 may indicate the degree to which the worker W is good or bad at the work.

The acquisition unit 102 may acquire the emotion information 120 of the worker W not only for business hours but also for a maximum of 24 hours. The generation unit 104 may quantify and evaluate an accumulated state of fatigue due to work of the worker W or the recovery degree, or a decrease in an amount of activity due to a depressed state caused by a mental burden on the basis of the emotion information 120 outside work hours (break time, or the like) or outside business hours, to be included in the aptitude information 130.

As described above, according to the present example embodiment, the acquisition unit 102 acquires the work information 110 and the emotion information 120, and the generation unit 104 associates the work information 110 and the emotion information 120 using points in time, and generates the aptitude information 130 indicating the aptitude degree for work for each person. As a result, the manager M can understand a state of the worker W at the time of work, and can manage work that the worker is good at or is not good at. As a result, the manager M can take appropriate measures on the basis of the aptitude information 130 of the worker for each piece of work. The wearable terminal 30 is used, and thus it is possible to check a state of the worker W not only for business hours but also for a maximum of 24 hours. Consequently, there is a possibility that the manager M can check an accumulated state or the recovery degree of fatigue due to work of the worker W, or check whether the worker W is not in a depressed state due to a mental burden.

Second Example Embodiment

An information processing apparatus 100 of the present example embodiment is the same as that of the above-described example embodiment except that the information processing apparatus 100 has a configuration of generating the aptitude information 130 by further using vital information. The information processing apparatus 100 in FIG. 6 has the same configuration as that of the information processing apparatus 100 in FIG. 3, and will thus be described with reference to FIG. 3.

Hardware Configuration Example

Figure 9:
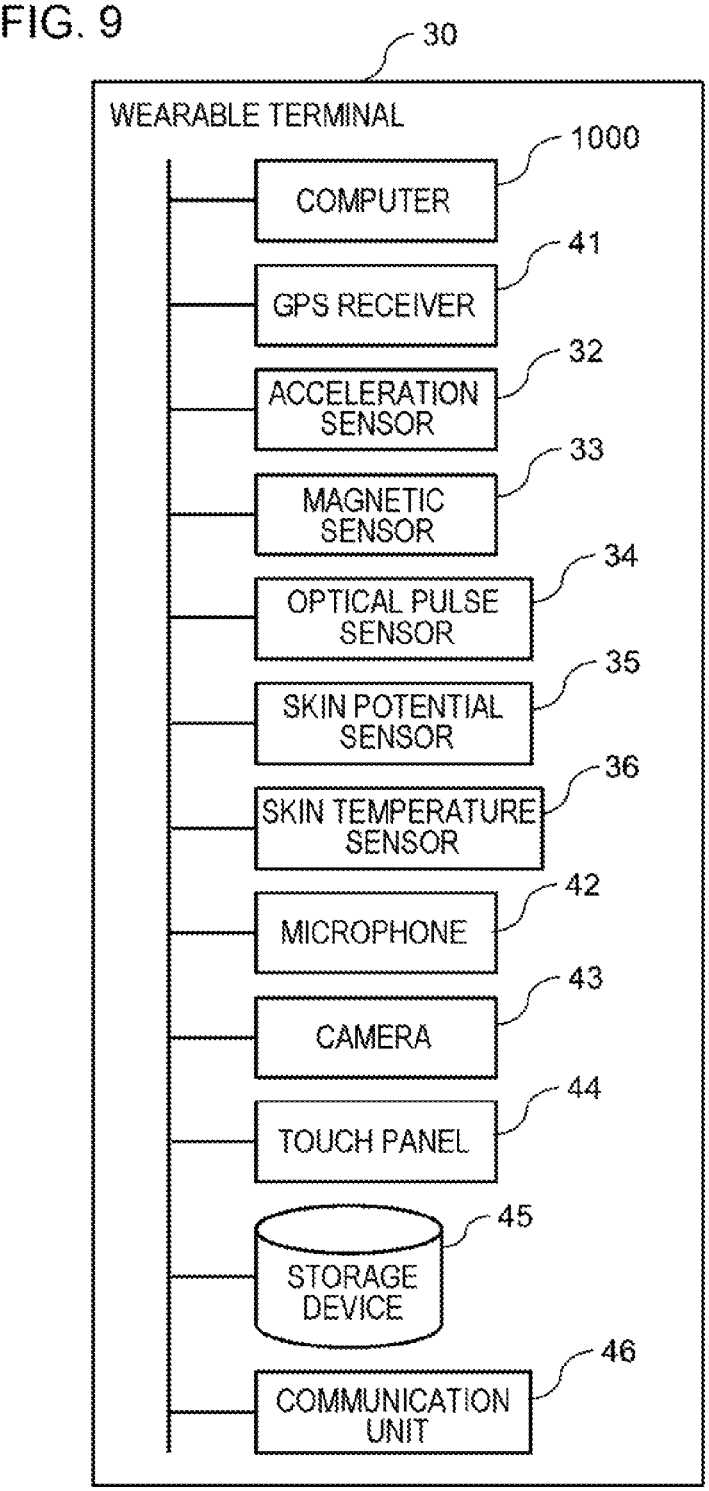
FIG. 9 is a diagram illustrating a configuration example of hardware of a wearable terminal.

FIG. 9 is a diagram illustrating a configuration example of hardware of a wearable terminal 30.

The wearable terminal 30 includes a computer 1000 in FIG. 2, a GPS receiver 41, a microphone 42, a camera 43, a touch panel 44, a storage device 45, and a communication unit 46. The wearable terminal 30 includes an acceleration sensor 32, a magnetic sensor 33, an optical pulse sensor 34, a skin potential sensor 35, and a skin temperature sensor 36 as constituents acquiring vital information. However, the constituents acquiring vital information is not limited thereto. For example, constituents (a sensor detecting movement of a body surface, a sphygmomanometer, an electroencephalogram sensor, a pH sensor, and the like) acquiring vital information such as a respiratory rate, blood pressure, electroencephalogram, and a pH value of sweat may be included.

The wearable terminal 30 may include, as constituents acquiring environmental information indicating the state of the environment around the worker W, a temperature sensor measuring the environmental temperature, a humidity sensor measuring the environmental humidity, a pressure sensor, an ultraviolet sensor, and an illuminance sensor.

Any one of the GPS receiver 41, the microphone 42, the camera 43, and the touch panel 44 need not be included in the wearable terminal 30. The mobile terminal 50 carried by the worker W and synchronized with the wearable terminal 30 worn by the worker W may include at least one of the GPS receiver 41, the microphone 42, the camera 43, and the touch panel 44.

The GPS receiver 41 receives the current position from a positioning system such as a global positioning system (GPS). However, the position information positioning system is not limited thereto. Other positioning systems (for example, a quasi-zenith satellite system (QZSS)) may be used.

The microphone 42 collects output voices of the worker W.

The camera 43 is a camera including a lens and an imaging element such as a charge coupled device (CCD) image sensor. An image captured by the camera 43 is at least one of a moving image, a still image, and a frame image at a predetermined interval. For example, the worker W may be instructed to periodically image the face of the worker W by using the camera 43 of the mobile terminal 50, and the captured face image of the worker may be transmitted to the server 10 as vital information 140. A facial expression of the worker may be analyzed from the captured face image of the worker, a ratio of smile, anger, sadness, or the like may be computed, to be used as the vital information 140. The facial expression analysis may be performed by the server 10, or a result of the facial expression analysis performed by the mobile terminal 50 may be transmitted to the server 10.

The touch panel 44 includes a display unit such as a liquid crystal display or an organic electroluminescence (EL) display, and an operation unit that receives a user's touch operation.

The storage device 45 corresponds to the memory 1030 and the storage device 1040 of the computer 1000 in FIG. 2.

The communication unit 46 corresponds to the input/output interface 1050 and the network interface 1060 of the computer 1000 shown in FIG. 2. Specifically, for example, the communication unit 46 has a communication constituent such as Bluetooth (registered trademark) for performing short-range wireless communication, and the Universal Serial Bus (USB), and performs wireless or wired communication with the mobile terminal 50.

In the present example embodiment, the wearable terminal 30 communicates with the mobile terminal 50 to transmit the vital information 140 to the mobile terminal 50, and the mobile terminal 50 transmits information such as the vital information 140 to the server 10 through the communication network 3. However, the wearable terminal 30 may have a communication function such as a wireless local area network (LAN), and information such as the vital information 140 may be transmitted from the wearable terminal 30 to the server 10 through the communication network 3.

The acceleration sensor 32 measures a movement velocity of the worker W per unit time. The magnetic sensor 33 may include a geomagnetic sensor, and measures a position of the worker W and an azimuth of the body. The values measured by the acceleration sensor 32 and the magnetic sensor 33 are used to compute and estimate, for example, the number of steps, an amount of activity, an activity content (a pose, exercise, walking, running, rest, and the like) of the worker W.

The optical pulse sensor 34 measures pulses of the worker W on the basis of reflected light. The skin potential sensor 35 measures a potential of the skin. Since the skin potential activity indicates characteristics influenced by sweating or a mental state, it is possible to infer the sweating or the mental state of the worker W by measuring the skin potential. The skin temperature sensor 36 measures the temperature of the skin surface of the worker W.

Functional Configuration Example

In the present example embodiment, the acquisition unit 102 and the generation unit 104 have the same functions as those of the information processing apparatus 100 in FIG. 3, and further have the following functions.

The acquisition unit 102 acquires the vital information 140 of a person who performed work in association with a point in time. The generation unit 104 generates the emotion information 120 by processing the vital information 140.

The generation unit 104 may further generate the aptitude information 130 by using the vital information 140.

The acquisition unit 102 acquires the work information 110 in which a content of work and a point in time at which the work was performed are associated. The work information 110 may be input to any of the server 10, the wearable terminal 30, the mobile terminal 50, and the terminal apparatus 60 illustrated in FIG. 1. Alternatively, the work information 110 may be automatically determined and/or acquired on the basis of vital information (data from the acceleration sensor 32, data from the optical pulse sensor 34, and the like) measured by the wearable terminal 30.

The vital information 140 includes, for example, at least one of a heart rate (heart rate interval (RRI)), a pulse rate (pulse interval (PPI)), a sweating amount (a skin potential or the like), a respiratory rate, an activity amount, an activity content (a pose, exercise, walking, running, rest, or the like), number of steps, a body surface temperature, a conversation amount, and a facial expression (a laughing face, an angry face, a crying face, or the like).

The vital information acquired by the acquisition unit 102 is stored in the storage apparatus 20.

FIG. 10 is a diagram illustrating an example of a data structure of the vital information 140. For example, the vital information 140 is information in which an integrated value or an average value of measured values from each sensor is stored in association with a point in time for each predetermined period such as every 10 minutes. For example, in a case of a pulse rate, an average value of pulse rates for 10 minutes from 9:00 to 9:10 is stored as the vital information 140 at 9:00 or 9:10. In a case of the number of steps, an integrated value of the number of steps for 10 minutes from 9:00 to 9:10 is stored as the vital information 140 at 9:00 or 9:10.

The vital information 140 stores the measured value, the integrated value, or the average value. Alternatively, values such as the maximum value, the minimum value, a median value, a standard deviation, the skewness, and the kurtosis of respective pieces of vital information 140 may be further stored every predetermined time. The predetermined time is at least one of any time interval (for example, 1 minute or 5 minutes), business hours, and working hours for each piece of work within the business hours.

An amount of change in each piece of vital information 140 over time, a variation in change (a sudden change, a gradual change, a violent fluctuation, or the like), the duration indicating a value beyond a normal state range of each piece of vital information 140, or the like may also be used to generate the emotion information 120.

For example, in a case where the vital information 140 such as a heart rate, a sweating state, or the skin temperature continuously exceeds the normal state range for a certain period, the generation unit 104 may determine that the worker W is in a tense state, and determine the state of comfort and discomfort or the awakening degree in the emotion information 120. For example, in a case where the heart rate, the sweating state, or the skin temperature is continuously within a steady state range for a certain period, and a fluctuation range within a predetermined period is within a predetermined range, the generation unit 104 may determine that the worker W is in a relaxed state, and determine the state of comfort and discomfort or the awakening degree in the emotion information 120.

For example, in a case where an amount of change in any frequency band within a predetermined period such as a heart rate, a sweating state, or a skin temperature, or a ratio of the amount of change in any frequency band is within a predetermined range, the generation unit 104 may determine that the worker W is in a tense state or a relaxed state, and determine the state of comfort and discomfort or the awakening degree in the emotion information 120. The generation unit 104 may determine the state of comfort and discomfort or the awakening degree in the emotion information 120 by combining the above-described various conditions with each other.

The emotion information 120 is indicated by using the two indexes as described above.

Values of the two indexes in the emotion information 120 are generated by processing various pieces of vital information 140 collected by the wearable terminal 30.

Operation Example

Figure 11:
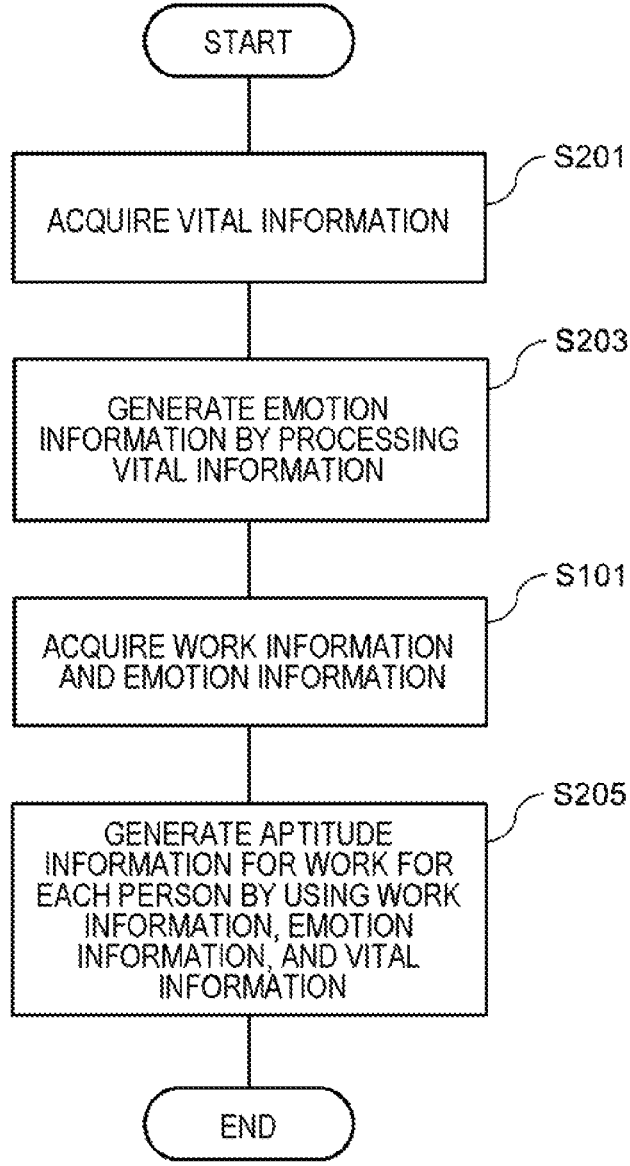
FIG. 11 is a flowchart illustrating an example of an operation of the information processing apparatus of the present example embodiment.

FIG. 11 is a flowchart illustrating an operation example of the information processing apparatus 100 of the present example embodiment. Processing procedures of the information processing apparatus 100 in this example include step S101 in FIG. 6 and further includes steps S201 to S205.

First, the acquisition unit 102 acquires the vital information 140 of the worker W (step S201). The generation unit 104 generates the emotion information 120 by processing the vital information 140 (step S203). Then, the acquisition unit 102 acquires the work information 110 and the emotion information 120 of the worker W (step S101). The generation unit 104 generates the aptitude information 130 for work for each person by using the work information 110, the emotion information 120, and the vital information 140 (step S205).

According to the present example embodiment, the same effect as that of the above-described example embodiment can be achieved, and the accuracy of the aptitude information 130 can be improved by generating the aptitude information 130 by using the vital information 140.

Third Example Embodiment

Figure 12:
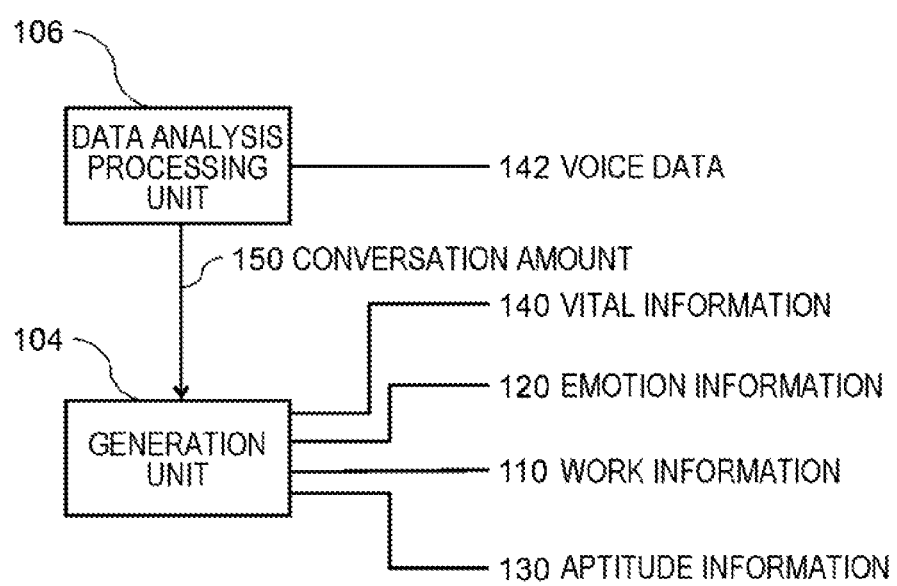
FIG. 12 is a functional block diagram illustrating a logical configuration of main constituents of the information processing apparatus of the present example embodiment.

FIG. 12 is a functional block diagram illustrating a logical fundamental configuration example of an information processing apparatus 100 of the present example embodiment. The information processing apparatus 100 of the present example embodiment is the same as that in either of the first example embodiment and the second example embodiment, except that the information processing apparatus 100 has a configuration of generating the aptitude information 130 by using a conversation amount of the worker W.

The information processing apparatus 100 includes an acquisition unit 102 (FIG. 3) and a generation unit 104 in the same manner as that in the above-described example embodiment, and further includes a data analysis processing unit 106. FIG. 12 illustrates only the generation unit 104 and the data analysis processing unit 106.

The acquisition unit 102 further acquires voice data 142 of the conversation of the worker W who performed work.

The generation unit 104 further uses a conversation amount obtained by processing the voice data 142 to generate the aptitude information 130.

The voice data of the worker W is collected by the microphone 42 of the wearable terminal 30 or the mobile terminal 50. The communication unit 46 of the wearable terminal 30 or the mobile terminal 50 transmits the voice data to the server 10 (information processing apparatus 100) through the communication network 3. The acquisition unit 102 acquires voice data 142 from the wearable terminal 30 or the mobile terminal 50 through the communication network 3.

The data analysis processing unit 106 performs a voice recognition process on the voice data 142 acquired by the acquisition unit 102, and obtains a conversation amount of the worker W. In the voice recognition process, a content of the conversation is not recognized, and a speaker is determined. The data analysis processing unit 106 measures the time during which the worker is having a conversation every predetermined time (for example, 10 minutes) and obtains the conversation amount.

In the present example embodiment, the data analysis processing unit 106 performs the voice recognition process on the voice data 142 to obtain the conversation amount of the worker W, but the data analysis processing unit 106 may perform analysis processing on, for example, video or image data to analyze a behavior or a facial expression of the worker W. A time for which a predetermined action (sitting, standing, walking, running, computer work, or physical labor) is performed, a time for which a predetermined facial expression (a laughing face, a crying face, an angry face, the number of times of winking, or a tick-like symptom) is made, or the like may be measured.

Alternatively, the data analysis processing unit 106 may measure the number of words spoken by the worker W within a predetermined time and use the number of words as the conversation amount. The data analysis processing unit 106 may measure the strength of output voice or a velocity of the utterance (fast or slow tone, or the like) and quantify a change therein every predetermined time to obtain the vital information 140. The data analysis processing unit 106 may measure the number of soliloquies (for example, the number of words) of the worker W every predetermined time to obtain the vital information 140.

According to the present example embodiment, the same effect as that of the above-described example embodiment is achieved, and the aptitude information 130 is generated by using the conversation amount of the worker W such that the accuracy of the aptitude information 130 is further improved.

Fourth Example Embodiment

Figure 13:
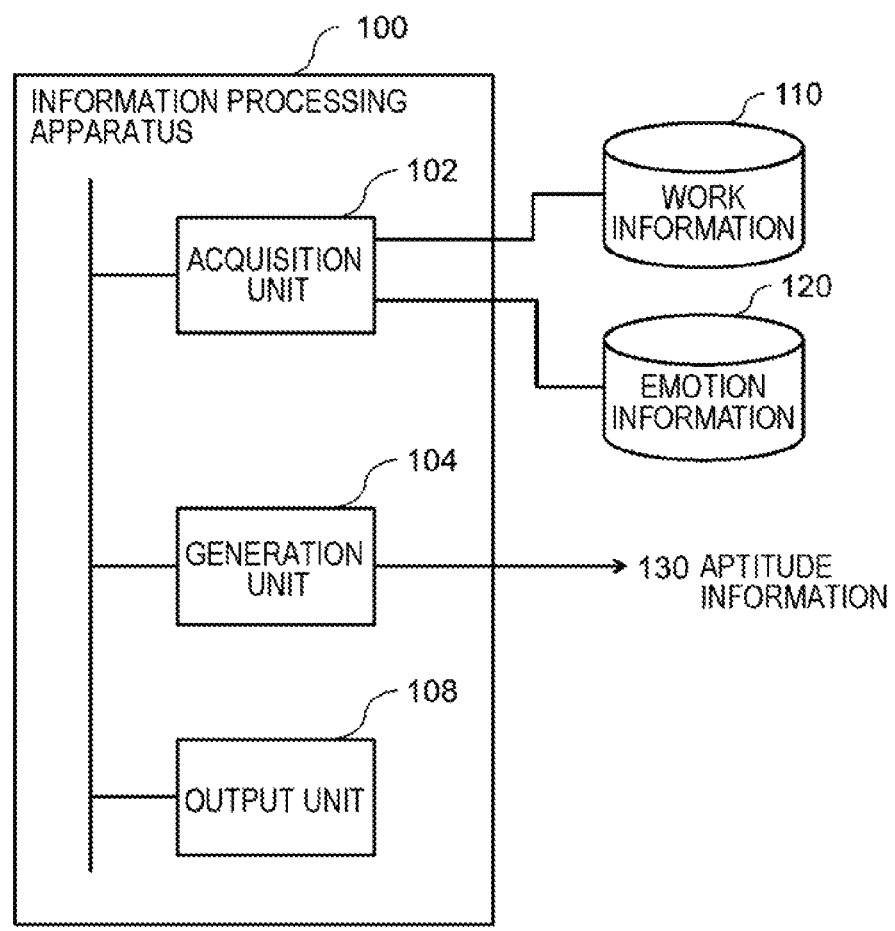
FIG. 13 is a functional block diagram illustrating a logical configuration of the information processing apparatus of the present example embodiment.

FIG. 13 is a functional block diagram illustrating a logical configuration example of an information processing apparatus 100 of the present example embodiment. The information processing apparatus 100 of the present example embodiment is the same as that in any of the above-described example embodiments except that the information processing apparatus 100 has a configuration of outputting a person suitable for work by using the aptitude information 130. The information processing apparatus 100 includes an acquisition unit 102, a generation unit 104, and an output unit 108. The acquisition unit 102 and the generation unit 104 are the same as those in any of the first example embodiment, the second example embodiment, and the third example embodiment. In FIG. 13, the data analysis processing unit 106 of the third example embodiment is not included, but the present example embodiment may be combined with the configuration of the third example embodiment.

The output unit 108 outputs a person suitable for specified work by using the aptitude information 130.

The output unit 108 displays the person on, for example, a screen of a display of the terminal apparatus 60 and/or outputs the person to a printer connected to the display of the terminal apparatus 60 to be printed. The output unit 108 displays a screen for specifying work on the display and receives specifying of work. The output unit 108 may receive input of the number of persons to be output or conditions (a predetermined value or greater and the like) for the aptitude degree on the specifying screen.

The output unit 108 sorts workers in descending order of aptitude degree for the specified work, and outputs a predefined number of persons or a specified number of persons. Alternatively, the output unit 108 may output persons of which the aptitude degree is equal to or more than a predetermined value for the specified work in descending order of aptitude degree.

For example, the output unit 108 outputs the aptitude information 130 in a list of a predetermined number of persons (for example, the best 10 persons) from the top (for example, in order from the one with the highest aptitude degree) for work specified in advance or as needed.

FIG. 14 is a diagram illustrating an example of a worker candidate list 160. The worker candidate list 160 lists a specified number of persons of which the aptitude information 130 for work A is higher. Attribute information (gender, department, age, or the like) of a person may be included in the worker candidate list 160. The worker candidate list 160 may include the aptitude degree of each person.

According to the present example embodiment, the output unit 108 can specify work and output a person suitable for the work. Consequently, a person suitable for work can be listed and presented to a user (for example, the manager M). The user can place a worker in the right place with reference to the worker candidate list 160. Since the worker can also take charge of the suitable work, the efficiency is improved, the productivity is increased, and the mental burden of the worker is reduced.

Fifth Example Embodiment

Figure 15:
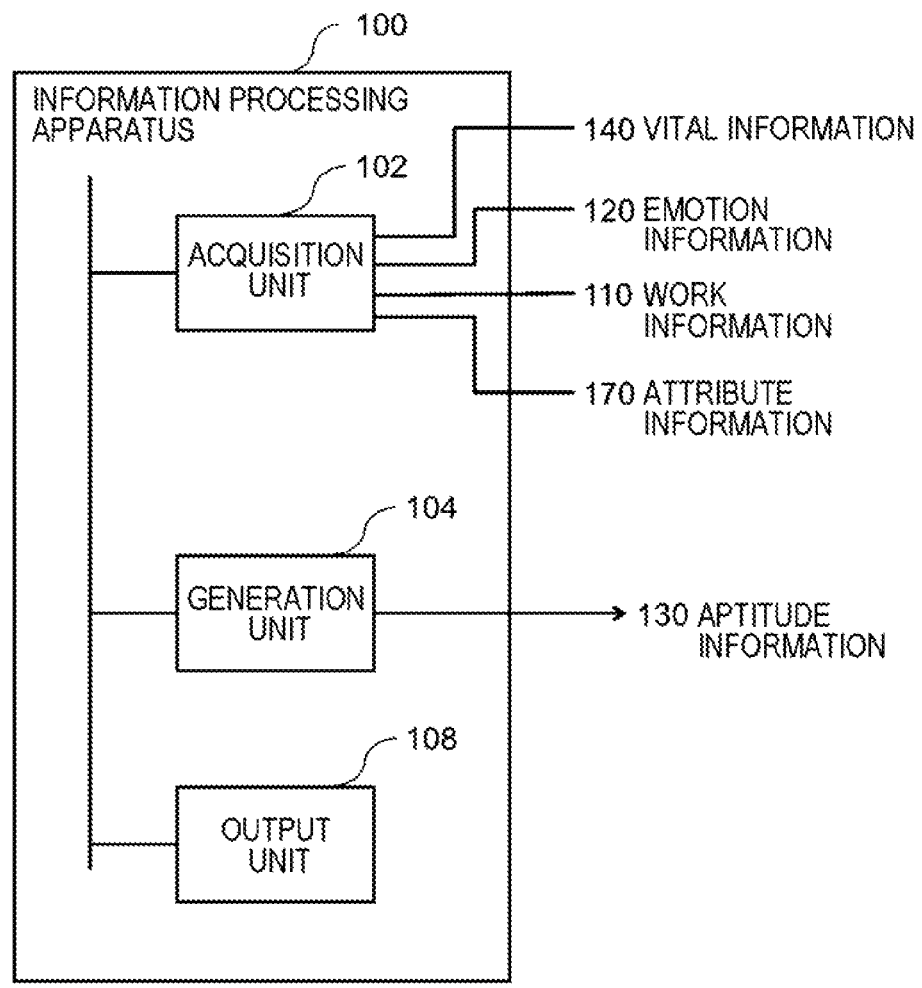
FIG. 15 is a functional block diagram illustrating a logical configuration of the information processing apparatus of the present example embodiment.

FIG. 15 is a functional block diagram illustrating a logical configuration of an information processing apparatus 100 of the present example embodiment. The information processing apparatus 100 of the present example embodiment is the same as that in any of the above-described example embodiments except that attribute information 170 is further used to generate the aptitude information 130 of the worker. In the example in FIG. 15, the information processing apparatus 100 includes the acquisition unit 102, the generation unit 104, and the output unit 108 that are the same as those of the information processing apparatus 100 of the fourth example embodiment in FIG. 13.

The generation unit 104 further generates the aptitude information 130 of a person by using the attribute information 170 of the person who performed work.

FIG. 16 is a diagram illustrating an example of a data structure of the attribute information 170. The attribute information 170 includes, for example, a gender, age, length of service, department, a skill level, achievements (the number of handled cases, a work content, an education history, and the like), and restrictions (a vacation schedule, reduced working hours, night shift NG, and the like).

The attribute information 170 may further include a worker's past work history.

The output unit 108 receives a specification of an attribute condition of as least one of the attribute information 170 on the specifying screen, selects a person to perform work based on the specified attribute condition of the attribute information, and outputs the selected person. In a case where a plurality of persons are selected, the output unit 108 further narrows down and outputs the persons by using the aptitude information 130 of the persons. Specifically, the output unit 108 sorts the selected workers in descending order of aptitude degree for the specified attribute condition, and outputs a predefined number of persons or a specified number of persons. Alternatively, the output unit 108 may output persons of which the aptitude degree is equal to or more than a predetermined value for the specified attribute condition in descending order of aptitude degree.

According to the present example embodiment, since the aptitude information 130 is generated by using the attribute information 170, the accuracy of the aptitude information 130 is further improved.

As mentioned above, the example embodiments of the present invention have been described with reference to the drawings, but these are examples of the present invention, and various configurations other than the description may be employed.

For example, the generation unit 104 may generate the aptitude information 130 by further using a working time for which work is performed by a person.

The work time is the time taken for the work. The generation unit 104 computes a difference between the work time of a worker and the standard time required for the work. The generation unit 104 may compare the computed work time of the worker with the standard time, and may classify the worker into one of fast, standard, and slow.

The generation unit 104 further uses the work time of the worker to generate the aptitude information 130. In a case where the work time is fast, this indicates that the work is suitable for the worker, and, in a case where the work time is slow, this indicates that the work is not suitable for the worker. The generation unit 104 adjusts the aptitude degree of the worker for the work according to this rule.

According to the configuration, the aptitude information 130 is also generated by using a difference between the work time of the worker and the standard time, and thus the accuracy of the aptitude information 130 is improved. It prevents work from being assigned to a person who is not good at the work, and thus a probability of improving productivity is increased.

In the above-described example embodiments, the work information 110 and the emotion information 120 are each associated with a point in time, but in other example embodiments, the work information 110 and the emotion information 120 need not be associated with a point in time. The acquisition unit 102 may acquire the work information 110 that distinguishes contents of work and the emotion information 120 of a person who performed the work. The generation unit 104 generates the aptitude information 130 indicating the aptitude degree for work for each person in association with the work information 110 and the emotion information 120.

For example, at the start of work, when the worker W presses a start button on an operation screen (not illustrated) of the mobile terminal 50, the acquisition unit 102 may start to acquire the work information 110, the emotion information 120, and/or the vital information 140. At the finish of the work, when the worker W presses a finish button on the operation screen (not illustrated) of the mobile terminal 50, the acquisition unit 102 may finish to acquire the work information 110, the emotion information 120, and/or the vital information 140. Then, the work information 110, the emotion information 120, and/or the vital information 140 may be acquired and recorded in association with each other at predetermined time intervals during a work time between the start and the finish of the work.

As mentioned above, the present invention has been described with reference to the example embodiments and the Examples, but the present invention is not limited to the example embodiments and the Examples. The configuration or details of the present invention may be subjected to various changes which can be understood by a person skilled in the art within the scope of the present invention.

Note that acquisition and use of information regarding a user in the present invention are assumed to be performed legally.

Some or all of the above-described example embodiments may be disclosed as in the following appendix, but are not limited thereto.

1. An information processing apparatus including:
an acquisition unit that acquires work information that distinguishes contents of work, and emotion information of a person who performed the work; and
   a generation unit that generates aptitude information indicating an aptitude degree for the work for each person in association with the work information and the emotion information.

2. The information processing apparatus according to 1., in which
   the work information and the emotion information are recorded in association with a point in time at which the work was performed.

3. The information processing apparatus according to 1. or 2., in which
   the acquisition unit acquires vital information of the person who performed the work in association with a point in time at which the work was performed, and
   the generation unit generates the emotion information by processing the vital information.

4. The information processing apparatus according to 3., in which
   the generation unit generates the aptitude information by using the vital information.
5. The information processing apparatus according to any one of 1. to 4., in which
   the acquisition unit further acquires voice data of a conversation of the person who performed the work, and
   the generation unit generates the aptitude information by further using an amount of the conversation obtained by processing the voice data.
6. The information processing apparatus according to any one of 1. to 5., further including:
   an output unit that outputs a person suitable for specified work by using the aptitude information.
7. The information processing apparatus according to any one of 1. to 6., in which
   the emotion information uses states of comfort and discomfort of the person when the work was performed as a first index, and
   the generation unit generates the aptitude information by using coordinates with the first index as a first axis.
8. The information processing apparatus according to 7., in which
   the emotion information further uses an awakening degree of the person for each point in time as a second index, and
   the generation unit generates the aptitude information by using coordinates with the first index as the first axis and the second index as a second axis.
9. The information processing apparatus according to any one of 1. to 8., in which
   the generation unit generates the aptitude information by further using a work time for which the person performed the work.
10. The information processing apparatus according to any one of 1. to 9., in which
   the generation unit generates the aptitude information of the person by further using attribute information of the person who performed the work.
11. The information processing apparatus according to 10., in which
   the attribute information includes a past work history of the person,
   the information processing apparatus further includes an output unit that receives a specification of the attribute information, selects a person to perform work based on the specified attribute information, and outputs the selected person, and
   in a case where a plurality of persons are selected, the output unit narrows down the persons by further using the aptitude information of the persons to output the person.
12. An information processing method executed by an information processing apparatus, the method including:
   acquiring work information that distinguishes contents of work, and emotion information of a person who performed the work; and
   generating aptitude information indicating an aptitude degree for the work for each person in association with the work information and the emotion information.
13. The information processing method according to 12., in which
   the work information and the emotion information are recorded in association with a point in time at which the work was performed.
14. The information processing method according to 12. or 13., including:
   acquiring vital information of the person who performed the work in association with a point in time at which the work was performed, and
   generating the emotion information by processing the vital information.
15. The information processing method according to 14., including
   generating the aptitude information by using the vital information.
16. The information processing method according to any one of 12. to 15., including:
   acquiring further voice data of a conversation of the person who performed the work, and
   generating the aptitude information by further using an amount of the conversation obtained by processing the voice data.
17. The information processing method according to any one of 12. to 16., including
   outputting a person suitable for specified work by further using the aptitude information.
18. The information processing method according to any one of 12. to 17., in which
   the emotion information uses states of comfort and discomfort of the person when the work was performed as a first index, and
   the method includes generating the aptitude information by using coordinates with the first index as a first axis.
19. The information processing method according to 18., in which
   the emotion information further uses an awakening degree of the person for each point in time as a second index, and
   the method includes generating the aptitude information by using coordinates with the first index as the first axis and the second index as a second axis.
20. The information processing method according to any one of 12. to 19., including
   generating the aptitude information by further using a work time for which the person performed the work.
21. The information processing method according to any one of 12. to 20., including
   generating the aptitude information of the person by further using the attribute information of the person who performed the work.
22. The information processing method according to 21., in which
   the attribute information includes a past work history of the person, and the method includes:
   receiving a specification of the attribute information,
   selecting a person to perform work based on the specified attribute information,
   outputting the selected person,
   in a case where a plurality of persons are selected, narrowing down the persons by further using the aptitude information of the persons to output the person.
23. A non-transitory computer-readable storage medium storing a program causing a computer to execute:
   a procedure of acquiring work information that distinguishes contents of work, and emotion information of a person who performed the work; and
   a procedure of generating aptitude information indicating an aptitude degree for the work for each person in association with the work information and the emotion information.

24. The non-transitory computer-readable storage medium according to 23., wherein the program causes the computer to execute
  a procedure of recording the work information and the emotion information in association with a point in time at which the work was performed.

25. The non-transitory computer-readable storage medium according to 23. or 24., wherein the program causes the computer to execute
  a procedure of acquiring vital information of the person who performed the work in association with a point in time at which the work was performed, and
  a procedure of generating the emotion information by processing the vital information.

26. The non-transitory computer-readable storage medium according to 25., wherein the program causes the computer to execute
  a procedure of generating the aptitude information by using the vital information.

27. The non-transitory computer-readable storage medium according to any one of 23. to 26., wherein the program causes the computer to execute
  a procedure of further acquiring voice data of a conversation of the person who performed the work, and
  a procedure of generating the aptitude information by further using an amount of the conversation obtained by processing the voice data.

28. The non-transitory computer-readable storage medium according to any one of 23. to 27., wherein the program causes the computer to execute
  a procedure of outputting a person suitable for specified work by using the aptitude information.

29. The non-transitory computer-readable storage medium according to any one of 23. to 28., wherein
  the emotion information uses states of comfort and discomfort of the person when the work was performed as a first index, and
  wherein the program causes the computer to execute a procedure of generating the aptitude information by using coordinates with the first index as a first axis.

30. The non-transitory computer-readable storage medium according to 29., wherein
  the emotion information further uses an awakening degree of the person for each point in time as a second index, and
  wherein the program causes the computer to execute a procedure of generating the aptitude information by using coordinates with the first index as the first axis and the second index as a second axis.

31. The non-transitory computer-readable storage medium according to any one of 23. to 30., wherein the program causes the computer to execute
  a procedure of generating the aptitude information by further using a work time for which the person performed the work.

32. The non-transitory computer-readable storage medium according to any one of 23. to 31., wherein the program causes the computer to execute
  a procedure of generating the aptitude information of the person by further using attribute information of the person who performed the work.

33. The non-transitory computer-readable storage medium according to 32., wherein
  the attribute information includes a past work history of the person, and
  wherein the program wherein the program causes the computer to execute
    a procedure of receiving a specification of the attribute information, selecting a person to perform work based on the specified attribute information, and outputting the selected person, and
    a procedure of, in a case where a plurality of persons are selected, narrowing down the persons by further using the aptitude information of the persons to output the person.

It is apparent that the present invention is not limited to the above embodiment, and may be modified and changed without departing from the scope and spirit of the invention.

What is claimed is:

1. An information processing apparatus comprising:
  at least one memory configured to store instructions; and
  at least one processor configured to execute the instructions to:
    acquire work information that distinguishes contents of work, and emotion information of a person who performed the work; and
    generate aptitude information indicating an aptitude degree for each of contents of the work for each person in association with the work information and the emotion information,
  wherein the emotion information indicates, respective to ones of the contents of the work, states of comfort and discomfort of the person when the work was performed as a first index, and the emotion information further indicates an awakening degree of the person for each point in time, over a period of time, as a second index,
  wherein the at least one processor is further configured to execute the instructions to:
    generate the aptitude information by using first coordinates with the first index as a first axis;
    generate the aptitude information by using second coordinates with both the first index as the first axis and the second index as a second axis; and
    control a display to display the aptitude information based on the first index, the second index, and the four regions, and
  wherein four regions are separated by the first axis and the second axis, and the aptitude information indicates which region is plotted when the emotion information is plotted on at least one of the first coordinates and the second coordinates.

2. The information processing apparatus according to claim 1, wherein
  the work information and the emotion information are recorded in association with a point in time at which the work was performed.

3. The information processing apparatus according to claim 1, wherein
  the at least one processor is further configured to execute the instructions to:
    acquire vital information of the person who performed the work in association with a point in time at which the work was performed, and
    generate the emotion information by processing the vital information.

4. The information processing apparatus according to claim 3, wherein the at least one processor is further configured to execute the instructions to generate the aptitude information by using the vital information.

5. The information processing apparatus according to claim 1, wherein
  the at least one processor is further configured to execute the instructions to:
    further acquire voice data of a conversation of the person who performed the work;

perform a voice recognition process on the voice data to determine a conversation which is spoken by the person who performed the work;

measure a time during which the worker is having a conversation every predetermined time and obtain an amount of the conversation; and generate the aptitude information by further using t the amount of the conversation.

6. The information processing apparatus according to claim 1, wherein the at least one processor is further configured to execute the instructions to output a person suitable for specified work by using the aptitude information.

7. The information processing apparatus according to claim 1, wherein the at least one processor is further configured to execute the instructions to generate the aptitude information by further using a work time for which the person performed the work.

8. The information processing apparatus according to claim 1, wherein the at least one processor is further configured to execute the instructions to generate the aptitude information of the person by further using the attribute information of the person who performed the work.

9. The information processing apparatus according to claim 8, wherein the attribute information includes a past work history of the person, and the at least one processor is further configured to execute the instructions to receive specification of the attribute information, selects a person to perform work based on the specified attribute information, and output the selected person; and in a case where a plurality of persons are selected, narrow down the persons by further using the aptitude information of the persons to output the person.

10. The information processing apparatus according to claim 1, wherein at least part of the emotion information comprises biometric information acquired from one or more biometric sensors that were attached to and monitored the person who performed the work.

11. An information processing method executed by an information processing apparatus, the method comprising:

acquiring work information that distinguishes contents of work, and emotion information of a person who performed the work; and generating aptitude information indicating an aptitude degree for each of contents of the work for each person in association with the work information and the emotion information, wherein the emotion information indicates, respective to ones of the contents of the work, states of comfort and discomfort of the person when the work was performed as a first index, and the emoticon information further indicates an awakening degree of the person for each point in time, over a period of time, as a second index, wherein the method further comprises:

generating the aptitude information by using first coordinates with the first index as a first axis;

generating the aptitude information by using second coordinates with both the first index and the second index as a second axis; and controlling a display to display the aptitude information based on the first index, the second index, and the four regions, and wherein four regions are separated by the first axis and the second axis, and the aptitude information indicates which region plotted the emotion information is plotted on at least one of the first coordinates and the second coordinates.

12. A non-transitory computer-readable storage medium storing a program configured to cause a computer to execute:

a procedure of acquiring work information that distinguishes contents of work, and emotion information of a person who performed the work; and a procedure of generating aptitude information indicating an aptitude degree for each content of the work for each person in association with the work information and the emotion information, wherein the emotion information indicates, respective to ones of the contents of the work, states of comfort and discomfort of the person when the work was performed as a first index, and the emoticon information further indicates an awakening degree of the person for each point in time, over a period of time, as a second index, wherein the program is further configured to cause the computer to implement:

generating the aptitude information by using first coordinates with the first index as a first axis;

generating the aptitude information by using second coordinates with both the first index and the second index as a second axis; and controlling a display to display the aptitude information based on the first index, the second index, and the four regions, and wherein four regions are separated by the first axis and the second axis, and the aptitude information indicates which region plotted the emotion information is plotted on at least one of the first coordinates and the second coordinates.

* * * * *